(12) United States Patent
Seck

(10) Patent No.: US 12,253,978 B2
(45) Date of Patent: Mar. 18, 2025

(54) DETECTING AND REDUCING MONITORING REDUNDANCIES

(71) Applicant: Capital One Services, LLC, McLean, VA (US)

(72) Inventor: Mohamed Seck, Aubrey, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 18/449,527

(22) Filed: Aug. 14, 2023

(65) Prior Publication Data

US 2025/0061089 A1 Feb. 20, 2025

(51) Int. Cl.
*G06F 16/174* (2019.01)

(52) U.S. Cl.
CPC .............................. *G06F 16/1748* (2019.01)

(58) Field of Classification Search
None
See application file for complete search history.

(56) References Cited

U.S. PATENT DOCUMENTS

| | | | |
|---|---|---|---|
| 2007/0143851 A1* | 6/2007 | Nicodemus | G06F 16/17 |
| 2009/0066528 A1 | 3/2009 | Bickel et al. | |
| 2012/0290614 A1* | 11/2012 | Nandakumar | G06F 16/951 |
| | | | 707/E17.014 |
| 2013/0054680 A1* | 2/2013 | Nakano | G06F 16/58 |
| 2013/0179736 A1 | 7/2013 | Gschwind et al. | |
| 2017/0289178 A1* | 10/2017 | Roundy | G06F 16/11 |
| 2018/0075363 A1 | 3/2018 | Duraisamy et al. | |
| 2018/0217910 A1 | 8/2018 | Yang et al. | |
| 2018/0352034 A1* | 12/2018 | Mutreja | G06F 16/182 |
| 2019/0087253 A1* | 3/2019 | Li | G06F 16/1748 |
| 2019/0319987 A1* | 10/2019 | Levy | G06F 16/93 |
| 2021/0263669 A1 | 8/2021 | Yang | |
| 2021/0288981 A1* | 9/2021 | Numainville | G06F 16/95 |

FOREIGN PATENT DOCUMENTS

CN 105824744 A 8/2016

OTHER PUBLICATIONS

Min Chen, et al., "Big Data: A Survey," Moblie Ntw Appl, vol. 19 (2014), pp. 171-209.
Han Hu, et al., "Toward Scalable Systems for Big Data Analytics: A Technology Tutorial," IEEE Access, vol. 2 (2014), pp. 652-687.
Extended European Search Report for European Application No. EP241909886 dated Dec. 6, 2024, 18 pages.

* cited by examiner

*Primary Examiner* — Son T Hoang
(74) *Attorney, Agent, or Firm* — Harrity & Harrity, LLP

(57) ABSTRACT

In some implementations, a redundancy system may receive, from a log storage, a plurality of log files that were generated by a plurality of monitoring programs. The redundancy system may apply a machine learning model to the plurality of log files to detect one or more redundancies. The redundancy system may determine at least one monitoring program, in the plurality of monitoring programs, that is a candidate for removal based on the one or more redundancies. The redundancy system may transmit, to a ticket system, a command to open a ticket associated with the at least one monitoring program.

20 Claims, 9 Drawing Sheets

DETECTING AND REDUCING MONITORING REDUNDANCIES

BACKGROUND

Computer programs, such as local applications and/or cloud applications, may be monitored by external software. For example, monitoring programs may generate log files based on data input to, and/or data output from, monitored computer programs.

SUMMARY

Some implementations described herein relate to a system for detecting and reducing monitoring redundancies. The system may include one or more memories and one or more processors communicatively coupled to the one or more memories. The one or more processors may be configured to receive a plurality of log files that were generated by a plurality of monitoring programs. The one or more processors may be configured to apply a machine learning model to the plurality of log files to detect one or more redundancies. The one or more processors may be configured to determine at least one monitoring program, in the plurality of monitoring programs, that is a candidate for removal based on the one or more redundancies. The one or more processors may be configured to detect at least one log file, in the plurality of log files, that satisfies a removal condition. The one or more processors may be configured to transmit a command to disable the at least one monitoring program. The one or more processors may be configured to transmit a command to discard the at least one log file.

Some implementations described herein relate to a method of detecting and reducing monitoring redundancies. The method may include receiving, from a log storage, a plurality of log files that were generated by a plurality of monitoring programs. The method may include applying, by a redundancy system, a machine learning model to the plurality of log files to detect one or more redundancies. The method may include determining, by the redundancy system, at least one monitoring program, in the plurality of monitoring programs, that is a candidate for removal based on the one or more redundancies. The method may include transmitting, to a ticket system, a command to open a ticket associated with the at least one monitoring program.

Some implementations described herein relate to a non-transitory computer-readable medium that stores a set of instructions for detecting and reducing monitoring redundancies. The set of instructions, when executed by one or more processors of a device, may cause the device to receive a plurality of log files that were generated by a plurality of monitoring programs. The set of instructions, when executed by one or more processors of the device, may cause the device to apply a machine learning model to the plurality of log files to detect one or more redundancies. The set of instructions, when executed by one or more processors of the device, may cause the device to determine at least one monitoring program, in the plurality of monitoring programs, that is a candidate for removal based on the one or more redundancies. The set of instructions, when executed by one or more processors of the device, may cause the device to transmit, to an administrator device, an indication of the at least one monitoring program.

DETAILED DESCRIPTION

The following detailed description of example implementations refers to the accompanying drawings. The same reference numbers in different drawings may identify the same or similar elements.

Monitoring programs may track data input to computer programs, data output from computers programs, and/or execution statuses of computer programs, among other examples. The monitoring programs may store metrics associated with the computer programs in log files. Log files may encode unstructured data (e.g., in a text file) and/or structured data (e.g., in an extensible markup language (XML) file) and may include time-stamped documentation of events, behaviors, and/or conditions associated with the computer programs. Memory overhead for storing log files increases quickly as the number of monitoring programs that are deployed increases.

Memory overhead may be reduced by purging log files. However, determining which log files to discard consumes power and processing resources. Additionally, purging log files only temporarily frees memory overhead that will again be consumed when new log files are produced.

Some implementations described herein enable detection and disabling of redundant monitoring programs. As a result, memory overhead for storing log files is permanently reduced when the redundant monitoring programs are disabled and thus stop producing new log files. In some implementations, removal conditions may additionally be applied to determine which log files to discard. As a result, additional memory overhead is conserved, at least temporarily.

FIGS. 1A-1D are diagrams of an example 100 associated with detecting and reducing monitoring redundancies. As shown in FIGS. 1A-1D, example 100 includes a redundancy system, an administrator device, a log storage, a software database, a monitoring system, and a ticket system. These devices are described in more detail in connection with FIGS. 3 and 4.

Figure 1A:
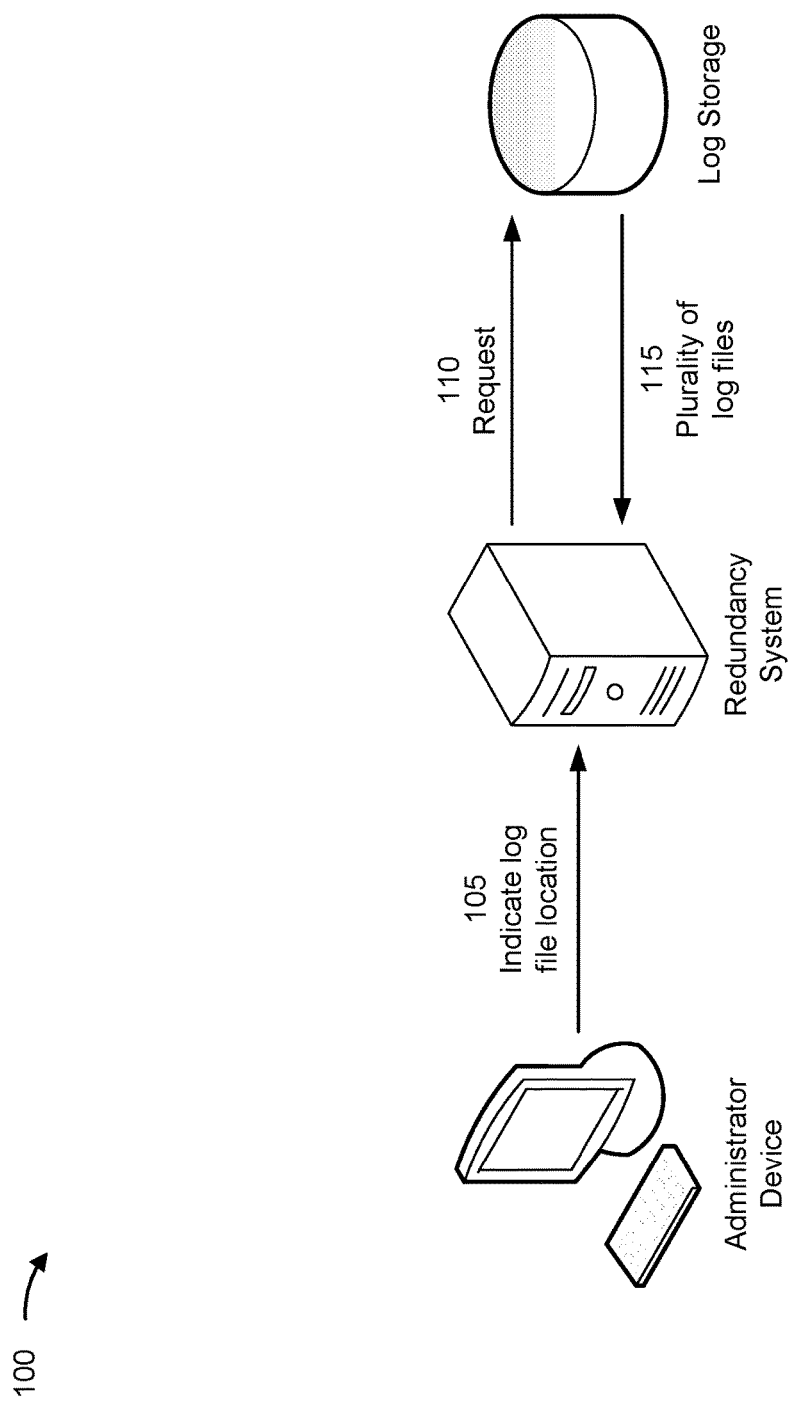
FIGS. 1A-1D are diagrams of an example implementation relating to detecting and reducing monitoring redundancies, in accordance with some embodiments of the present disclosure.

As shown in FIG. 1A and by reference number 105, the administrator device may transmit, and the redundancy system may receive, an indication of a location associated with log files (e.g., a plurality of log files). The log files may be associated with a cloud-based application and/or an application programming interface (API) endpoint. The location may include a filename, a file path, an alphanumeric identifier associated with the log files, and/or another type of identifier that indicates where the log files are stored.

In some implementations, a user of the administrator device may provide input (e.g., via an input component of the administrator device) that triggers the administrator device to transmit the indication of the location. For example, the user may interact with a user interface (UI) output by the administrator device (e.g., via an output component of the administrator device), and the input may be based on the interaction.

As shown by reference number 110, the redundancy system may transmit, and the log storage may receive, a request for the log files that indicates the location. In some implementations, the log storage may be local to the redundancy system (e.g., included in a cache or another type of memory controlled by the redundancy system). Accordingly, the request may include a read command transmitted to the memory. Alternatively, the log storage may be at least partially separate (e.g., physically, logically, and/or virtually) from the redundancy system. Accordingly, the request may include a hypertext transfer protocol (HTTP) request and/or a call to an API function associated with the log storage.

As shown by reference number 115, the log storage may transmit, and the redundancy system may receive, the log files. The log storage may transmit, and the redundancy system may receive, the log files in response to the request from the redundancy system. The log files were generated by monitoring programs (e.g., a plurality of monitoring programs). In some implementations, the log storage may indicate the monitoring programs with which the log files are associated. For example, an index file or another type of data structure may map identifiers of the log files (e.g., filenames and/or log numbers, among other examples) to identifiers of the monitoring programs (e.g., names, process identities (IDs), and/or thread IDs, among other examples).

Although the example 100 is described in connection with the administrator device providing an indication of the location for the log files, other examples may include the administrator device uploading the log files directly to the redundancy system. For example, the administrator device may transmit, and the redundancy system may receive, an archive or another type of data structure that includes the log files.

Figure 1B:
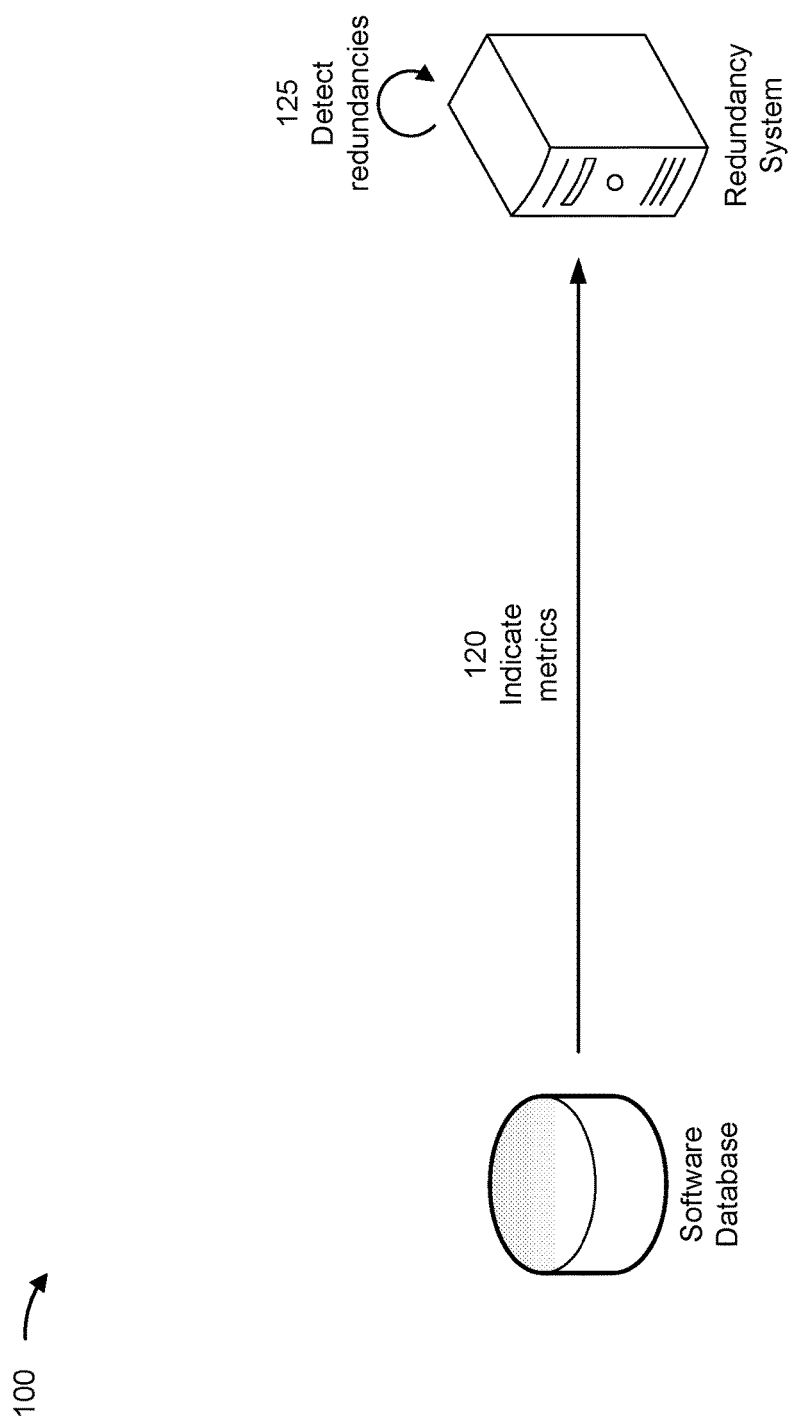

As shown in FIG. 1B and by reference number 120, the software database may transmit, and the redundancy system may receive, an indication of metrics (e.g., one or metrics) captured by the monitoring programs (e.g., at least one monitoring program in the plurality of monitoring programs). For example, the software database may transmit an indication that a first monitoring program tracks Internet protocol (IP) addresses and packet sizes and that a second monitoring program tracks IP addresses and latencies. The indication may include an index file or another type of data structure that maps identifiers of the metrics (e.g., names and/or formulas, among other examples) to identifiers of the monitoring programs (e.g., names, process IDs, and/or thread IDs, among other examples).

In some implementations, the redundancy system may transmit, and the software database may receive, a request for the metrics. In some implementations, the software database may be local to the redundancy system (e.g., included in a cache or another type of memory controlled by the redundancy system). Accordingly, the request may include a read command transmitted to the memory. Alternatively, the software database may be at least partially separate (e.g., physically, logically, and/or virtually) from the redundancy system. Accordingly, the request may include an HTTP request and/or a call to an API function associated with the software database. Thus, the software database may transmit, and the redundancy system may receive, the indication of the metrics in response to the request from the redundancy system. The redundancy system may subscribe to updates from the software database, such that the software database transmits the indication periodically (e.g., according to a schedule) and/or in response to an update (e.g., deployment of a new monitoring program and/or an update to metrics associated with an existing monitoring program).

Although the example 100 is described in connection with the software database as separate from the log storage, other examples may include the software database at least partially integrated (e.g., physically, logically, and/or virtually) with the log storage. Accordingly, the log storage may transmit the indication of the metrics in combination with the log files (e.g., in a same message or session). Alternatively, the log storage may transmit the indication of the metrics separately from the log files (e.g., in a different message or session).

As by reference number 125, the redundancy system may apply a machine learning model to the log files to detect redundancies (e.g., one or more redundancies). The machine learning model may be trained and used as described in connection with FIGS. 2A-2B. For example, the machine learning model may determine which files, out of the plurality of log files, are redundant as compared with remaining files out of the plurality of log files.

Additionally, the redundancy system may determine a monitoring program (e.g., at least one monitoring program in the plurality of monitoring programs) that is a candidate for removal based on the redundancies. The monitoring program that is a candidate for removal may be associated with log files that are determined as redundant by the machine learning model. In one example, the redundancy system may map some log files, determined as redundant by the machine learning model, to the monitoring program (e.g., using the data structure that maps identifiers of the log files to identifiers of the monitoring programs, as described above) and thus identify the monitoring program as a candidate for removal. In another example, the redundancy system may map metrics, included in log files that are determined as redundant by the machine learning model, to the monitoring program (e.g., using the data structure that maps identifiers of the metrics to identifiers of the monitoring programs, as described above) and thus identify the monitoring program as a candidate for removal.

Figure 1C:
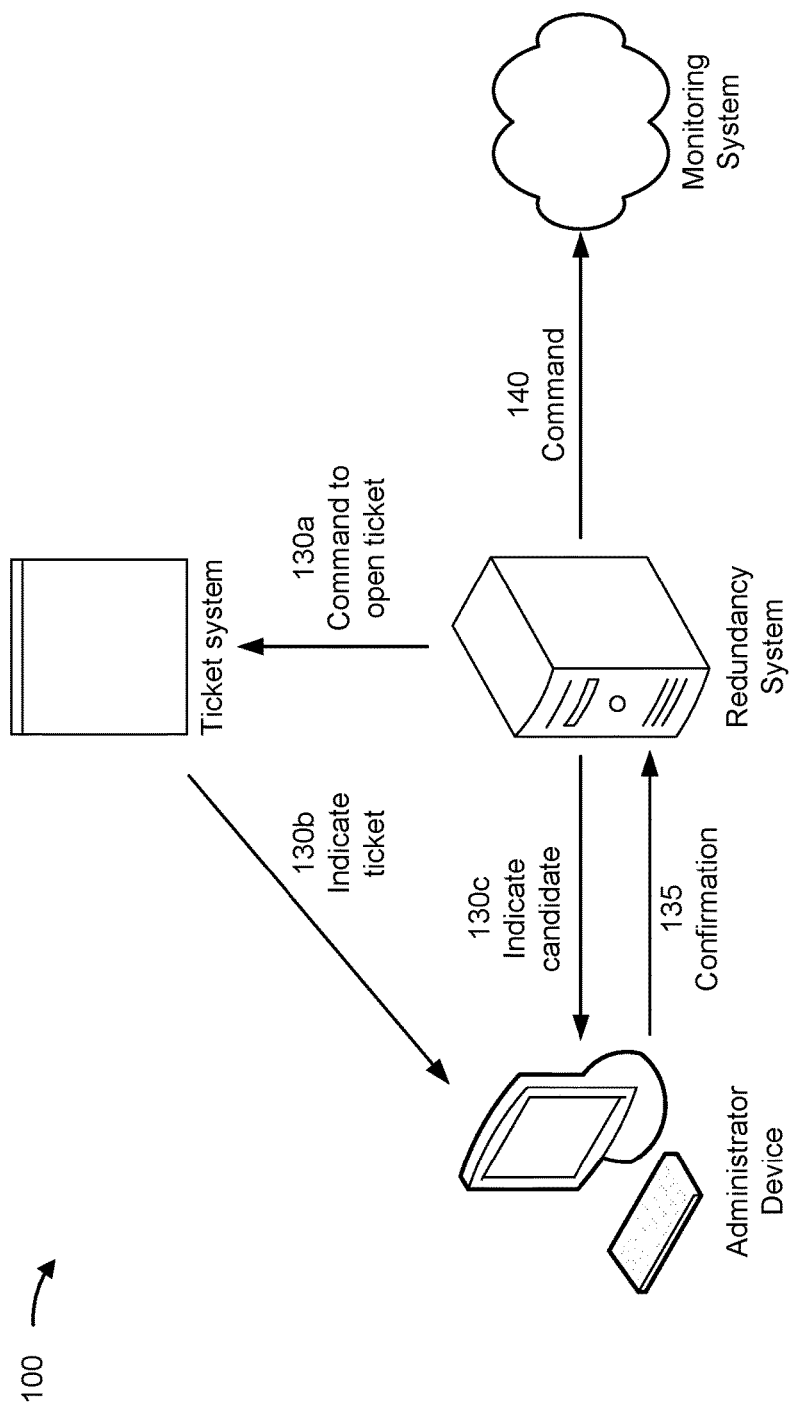

In some implementations, as shown in FIG. 1C and by reference number 130a, the redundancy system may transmit, and the ticket system may receive, a command to open a ticket associated with the monitoring program (that is a candidate for removal). For example, the command may include an identifier of the monitoring program (e.g., a name, a process ID, and/or a thread ID, among other examples). Additionally, the command may include an indication of a reason that the monitoring program is a candidate for removal (e.g., an indication of metrics collected by the monitoring program and/or a reason code based on output from the machine learning model, among other examples).

In some implementations, the redundancy system may identify a user (e.g., at least one user) associated with the monitoring program. For example, the software database and/or the log storage may provide a data structure that maps identifiers of users (e.g., names, usernames, and/or email addresses, among other examples) to identifiers of the monitoring programs (e.g., names, process IDs, and/or thread IDs, among other examples). The data structure that maps identifiers of users to identifiers of the monitoring programs may be the same data structure that maps identifiers of the log files to identifiers of the monitoring programs, as described above, and/or the same data structure that maps identifiers of the metrics to identifiers of the monitoring programs, as described above. The command to open the ticket may thus include an identifier of the user (e.g., a name, a username, and/or an email address, among other examples) identified by the redundancy system.

Therefore, as shown by reference number 130*b*, the ticket system may transmit, and a device associated with the user identified by the redundancy system (e.g., the administrator device in the example 100) may receive, an indication of the ticket. The ticket system may automatically transmit the indication based on opening the ticket. In some implementations, the ticket system may identify the device associated with the user. For example, a data structure may map identifiers of users (e.g., names, usernames, and/or email addresses, among other examples) to identifiers of devices (e.g., machine names, IP addresses, and/or medium access control (MAC) addresses, among other examples). Alternatively, the ticket system may identify an email address and/or a telephone number associated with the user, such that the indication of the ticket is included in an email message and/or a text message. The email address and/or the telephone number may be associated with the administrator device such that the email message and/or the text message is transmitted to the administrator device.

Additionally, or alternatively, as shown by reference number 130*c*, the redundancy system may transmit, and the administrator device may receive, an indication of the monitoring program (that is a candidate for removal). The indication may be a visual indication (e.g., based on instructions for a UI from the redundancy system). Additionally, or alternatively, the indication may be included in an email message or a text message. The redundancy system may identify an email address and/or a telephone number associated with the user based on a data structure that maps identifiers of users (e.g., names, usernames, and/or email addresses, among other examples) to email addresses and/or telephone numbers. The email address and/or the telephone number may be associated with the administrator device such that the email message and/or the text message is transmitted to the administrator device.

As shown by reference number 135, the administrator device may transmit, and the redundancy system may receive, a confirmation of the monitoring program (that is a candidate for removal). For example, the user of the administrator device may provide input (e.g., via an input component of the administrator device) that triggers the administrator device to transmit the confirmation. The user may interact with the indication of the monitoring program (e.g., with the visual indication included in a UI and/or with a hyperlink included in an email message or a text message, among other examples), and the input may be based on the interaction.

As shown by reference number 140, the redundancy system may transmit, and the monitoring system may receive, a command to disable the monitoring program (that is a candidate for removal). The monitoring system may include a cloud environment implementing the monitoring program. The command may trigger the monitoring system to halt execution of the monitoring program, which in turn ceases production of new log files from the monitoring program.

The redundancy system may transmit the command in response to the confirmation from the administrator device. Alternatively, the redundancy system may automatically transmit the command based on determining that the monitoring program is a candidate for removal.

Although the example 100 shows the monitoring program that is a candidate for removal as cloud-based, other examples may additionally or alternatively include a local instance of the monitoring program that is a candidate for removal. For example, the monitoring program may locally execute on a server, a laptop, or another type of device that is associated with the redundancy system. Accordingly, the redundancy system may transmit the command to the device that is locally executing the monitoring program. The command may trigger the device to halt execution of the monitoring program, which in turn ceases production of new log files from the monitoring program.

In some implementations, the redundancy system may additionally or alternatively determine an additional monitoring program (e.g., at least one additional monitoring program) that is a candidate for addition based on the redundancies. The additional monitoring program that is a candidate for addition may be associated with metrics that are determined as missing by the machine learning model. For example, the redundancy system may map metrics, indicated as absent from the log files by the machine learning model, to the additional monitoring program (e.g., using the data structure that maps identifiers of metrics to identifiers of monitoring programs, as described above) and thus identify the additional monitoring program as a candidate for addition.

Therefore, the redundancy system may also indicate the additional monitoring program in the command to open the ticket described above and/or may also indicate the additional monitoring program in the indication to the administrator device. Alternatively, the redundancy system may transmit an additional command to open a ticket associated with the additional monitoring program (that is a candidate for addition) and/or may transmit an additional indication of the additional monitoring program (that is a candidate for addition) to the administrator device. In some implementations, the redundancy system may transmit, and the monitoring system may receive, a command to initialize the additional monitoring program. The redundancy system may transmit the command in response to a confirmation (of the additional monitoring program) from the administrator device or automatically based on determining that the additional monitoring program is a candidate for addition.

Figure 1D:
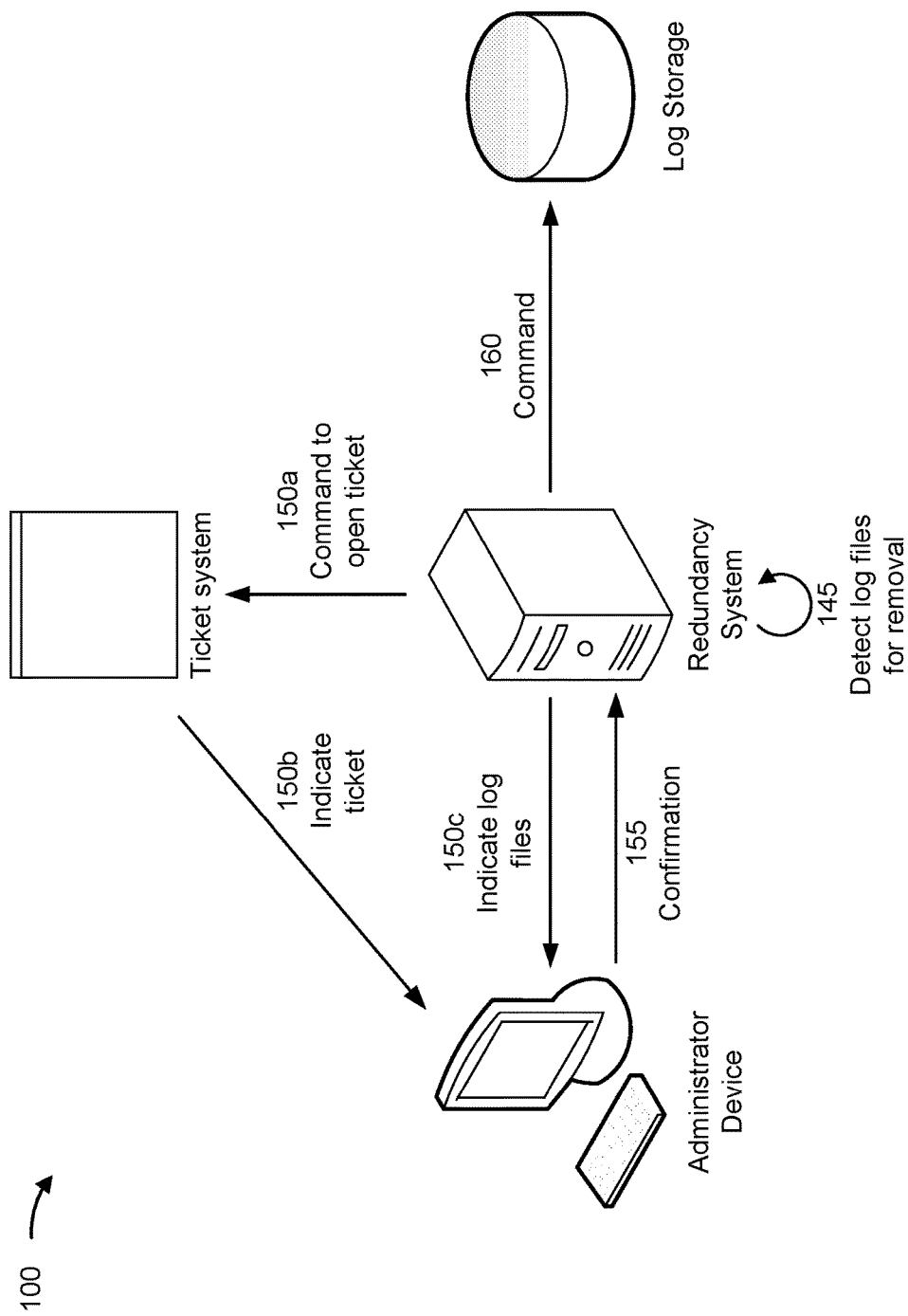

Furthermore, as shown in FIG. 1D and by reference number 145, the redundancy system may detect a log file (e.g., at least one log file), in the plurality of log files, that satisfies a removal condition. The removal condition may include a most recent access time associated with the log file satisfying an access threshold, a creation time associated with the log file satisfying an age threshold, and/or a modification time associated with the log file satisfying the age threshold. Other removal conditions may include the log file being associated with a disabled monitoring program (e.g., disabled as described above or disabled in the past by a user) and/or the log file being associated with a cloud-based application or an API endpoint that is deprecated or otherwise discontinued, among other examples.

In some implementations, as shown by reference number 150*a*, the redundancy system may transmit, and the ticket system may receive, a command to open a ticket associated with the log file (that satisfies the removal condition). For example, the command may include an identifier of the log file (e.g., a filename and/or a log number, among other examples). Additionally, the command may include an indication of a reason that the log file satisfies the removal condition (e.g., a most recent access time associated with the log file, a creation time associated with the log file, a modification time associated with the log file, and/or a reason code associated with the removal condition, among other examples).

In some implementations, the redundancy system may identify a user (e.g., at least one user) associated with the log file. For example, the software database and/or the log storage may provide a data structure that maps identifiers of users (e.g., names, usernames, and/or email addresses, among other examples) to identifiers of log files (e.g., filenames and/or log numbers, among other examples). The data structure that maps identifiers of users to identifiers of log files may be the same data structure that maps identifiers of log files to identifiers of the monitoring programs, as described above. The command to open the ticket may thus include an identifier of the user (e.g., a name, a username, and/or an email address, among other examples) identified by the redundancy system.

Therefore, as shown by reference number 150b, the ticket system may transmit, and a device associated with the user identified by the redundancy system (e.g., the administrator device in the example 100) may receive, an indication of the ticket. The ticket system may automatically transmit the indication based on opening the ticket. In some implementations, the ticket system may identify the device associated with the user. For example, a data structure may map identifiers of users (e.g., names, usernames, and/or email addresses, among other examples) to identifiers of devices (e.g., machine names, IP addresses, and/or MAC addresses, among other examples). Alternatively, the ticket system may identify an email address and/or a telephone number associated with the user, such that the indication of the ticket is included in an email message and/or a text message. The email address and/or the telephone number may be associated with the administrator device such that the email message and/or the text message is transmitted to the administrator device.

Additionally, or alternatively, as shown by reference number 150c, the redundancy system may transmit, and the administrator device may receive, an indication of the log file (that satisfies the removal condition). The indication may be a visual indication (e.g., based on instructions for a UI from the redundancy system). Additionally, or alternatively, the indication may be included in an email message or a text message. The redundancy system may identify an email address and/or a telephone number associated with the user based on a data structure that maps identifiers of users (e.g., names, usernames, and/or email addresses, among other examples) to email addresses and/or telephone numbers. The email address and/or the telephone number may be associated with the administrator device such that the email message and/or the text message is transmitted to the administrator device.

As shown by reference number 155, the administrator device may transmit, and the redundancy system may receive, a confirmation of the log file (that satisfies the removal condition). For example, the user of the administrator device may provide input (e.g., via an input component of the administrator device) that triggers the administrator device to transmit the confirmation. The user may interact with the indication of the log file (e.g., with the visual indication included in a UI and/or with a hyperlink included in an email message or a text message, among other examples), and the input may be based on the interaction.

As shown by reference number 160, the redundancy system may transmit, and the log storage may receive, a command to discard the log file (that satisfies the removal condition). The log storage may include a cloud storage associated with the log file. The command may trigger the log storage to delete the log file, which in turn reduces memory space consumed at the log storage.

The redundancy system may transmit the command in response to the confirmation from the administrator device. Alternatively, the redundancy system may automatically transmit the command based on determining that the log file satisfies the removal condition.

Although the example 100 shows the log file that satisfies the removal condition as stored in the cloud, other examples may additionally or alternatively include the log file that satisfies the removal condition being stored locally. For example, the log file may be locally stored on a server, a laptop, or another type of device that is associated with the redundancy system. Accordingly, the redundancy system may transmit the command to the device that is locally storing the log file. The command may trigger the device to delete the log file, which in turn reduces memory space consumed at the device.

By using techniques as described in connection with FIGS. 1A-1D, the redundancy system may detect and disable redundant monitoring programs. As a result, memory overhead associated with the log files is permanently reduced. Additionally, the redundancy system may apply the removal condition to determine which log files to discard. As a result, additional memory overhead is conserved, at least temporarily.

As indicated above, FIGS. 1A-1D are provided as an example. Other examples may differ from what is described with regard to FIGS. 1A-1D.

Figure 2A:
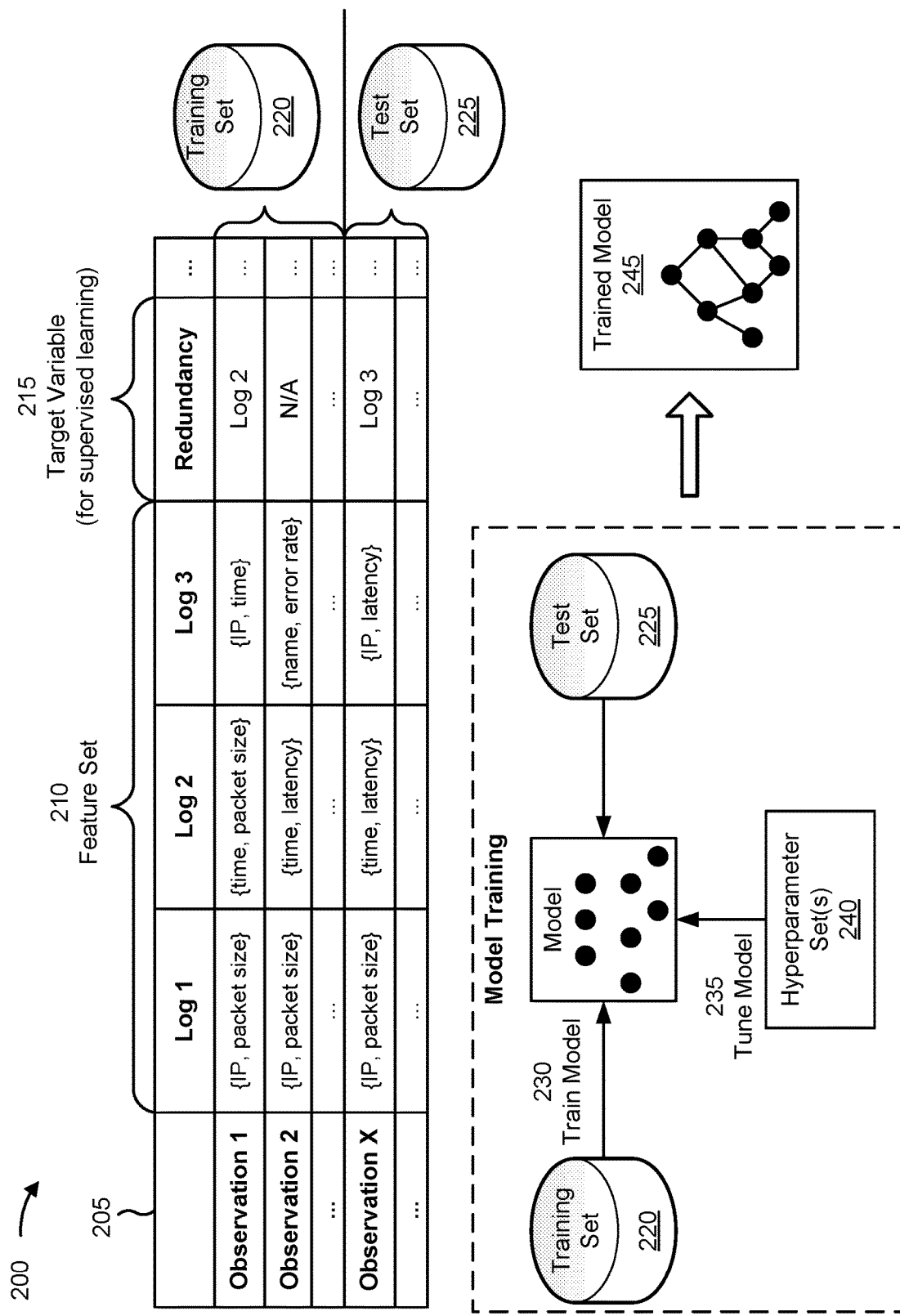
FIGS. 2A-2B are diagrams illustrating an example implementation relating to training and using a machine learning model in connection with detecting and reducing monitoring redundancies, in accordance with some embodiments of the present disclosure.
Figure 2B:
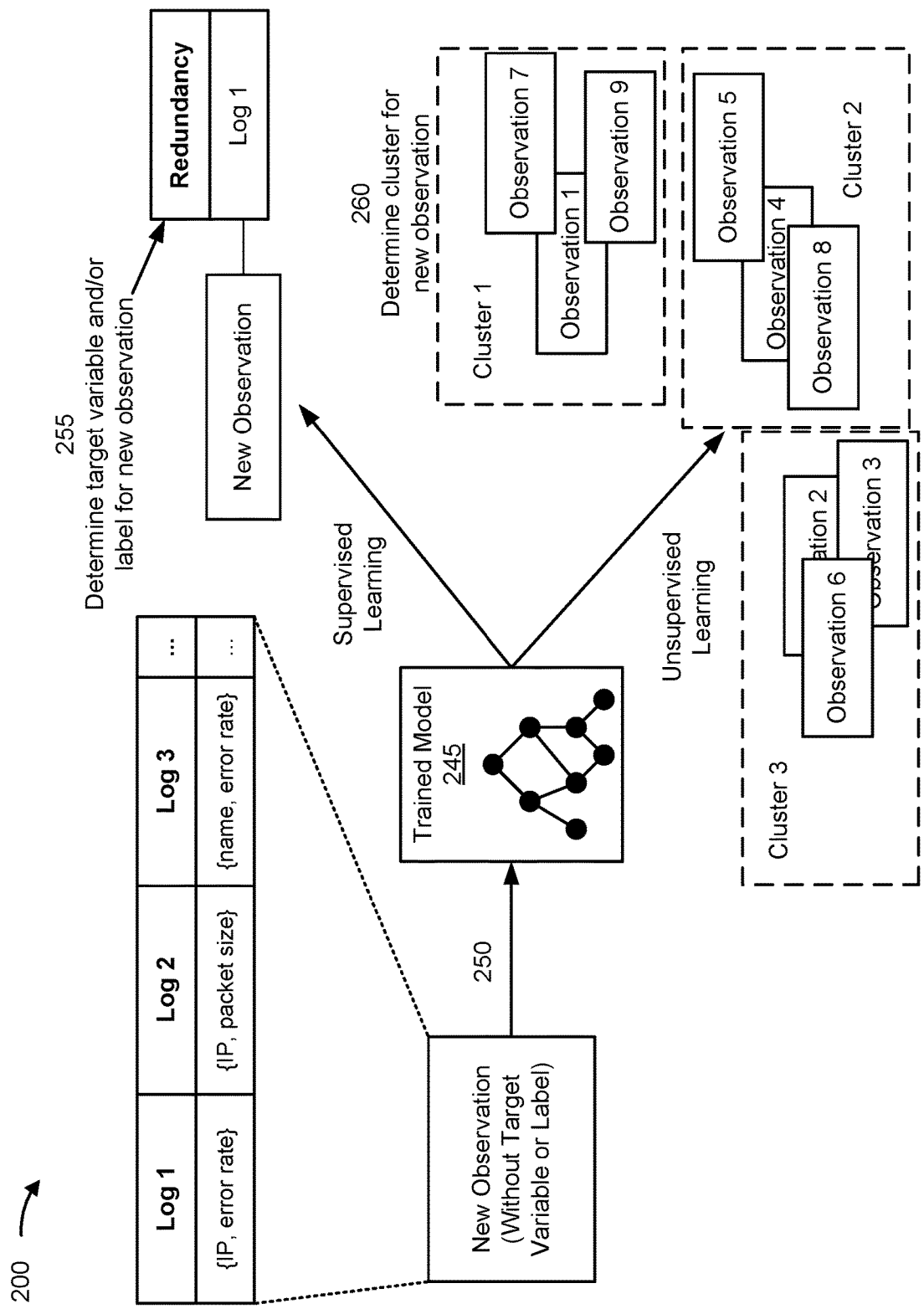

FIGS. 2A-2B are diagrams illustrating an example 200 of training and using a machine learning model in connection with detecting and reducing monitoring redundancies. The machine learning model training described herein may be performed using a machine learning system. The machine learning system may include or may be included in a computing device, a server, a cloud computing environment, or the like, such as the redundancy system described in more detail below.

As shown by reference number 205, a machine learning model may be trained using a set of observations. The set of observations may be obtained and/or input from training data (e.g., historical data), such as data gathered during one or more processes described herein. For example, the set of observations may include data gathered from the log storage, as described elsewhere herein. In some implementations, the machine learning system may receive the set of observations (e.g., as input) from the redundancy system.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the redundancy system. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a vectorized representation of a first log file, a second feature of a vectorized representation of a second log file, a third feature of a vectorized representation of a third log file, and so on. As shown, for a first observation, the first feature may have a value of {IP addresses, packet sizes}, the second feature may have a value of {times, packet sizes}, the third feature may have a value of {IP addresses, times}, and so on. These features and feature values are provided as examples, and may differ in other examples. For example, the feature set may include one or more of the following features: matrixed representations of log files and/or category labels associated with log files, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is an identified redundancy, which has a value of "Log 2" for the first observation.

The feature set and target variable described above are provided as examples, and other examples may differ from what is described above. For example, for a target variable of a missing metric, the feature set may include metrics associated with log files.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that may include a first subset of observations, of the set of observations, and a test set 225 that may include a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

FIG. 2B illustrates applying the trained machine learning model 245 to a new observation. As shown by reference number 250, the machine learning system may receive a new observation (or a set of new observations), and may input the new observation to the machine learning model 245. As shown, the new observation may include a first feature of a vectorized representation of a first log file, a second feature of a vectorized representation of a second log file, a third feature of a vectorized representation of a third log file, and so on, as an example. The machine learning system may apply the trained machine learning model 245 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 245 may predict a value of "Log 1" for the target variable of an identified redundancy for the new observation, as shown by reference number 255. Based on this prediction (e.g., based on the value having a particular label or classification or based on the value satisfying or failing to satisfy a threshold), the machine learning system may provide a recommendation and/or output for determination of a recommendation, such as recommending a monitoring program to disable. Additionally, or alternatively, the machine learning system may perform an automated action and/or may cause an automated action to be performed (e.g., by instructing another device to perform the automated action), such as disabling a monitoring program associated with Log 1. As another example, if the machine learning system were to predict a value of "Log 2" for the target variable of an identified redundancy, then the machine learning system may provide a different recommendation (e.g., recommending a different monitoring program to disable) and/or may perform or cause performance of a different automated action (e.g., disabling a monitoring program associated with Log 2). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 245 may classify (e.g., cluster) the new observation in a cluster, as shown by reference number 260. The observations within a cluster may have a threshold degree of similarity. As an example, if the machine learning system classifies the new observation in a first cluster (e.g., associated with redundancies), then the machine learning system may provide a first recommendation, such as recommending a different monitoring program to disable. Additionally, or alternatively, the machine learning system may perform a first automated action and/or may cause a first automated action to be performed (e.g., by instructing another device to perform the automated action) based on classifying the new observation in the first cluster, such as disabling a monitoring program associated with log files in the first cluster. As another example, if the machine learning system were to classify the new observation in a second cluster (e.g., unassociated with redundancies), then the machine learning system may provide a second (e.g., different) recommendation (e.g., recommending a monitoring program to maintain) and/or may perform or cause performance of a second (e.g.,
different) automated action, such as refraining from disabling a monitoring program associated with log files in the second cluster.

The recommendations, actions, and clusters described above are provided as examples, and other examples may differ from what is described above. For example, the recommendations associated with a cluster of missing metrics may include recommending a monitoring program to add. The actions associated with a cluster of missing metrics may include, for example, initializing a monitoring program associated with metrics in the cluster.

In this way, the machine learning system may apply a rigorous and automated process to identifying redundancies in log files. The machine learning system may enable recognition and/or identification of tens, hundreds, thousands, or millions of features and/or feature values for tens, hundreds, thousands, or millions of observations, thereby increasing accuracy and consistency and reducing delay associated with disabling monitoring programs relative to requiring computing resources to be allocated for tens, hundreds, or thousands of operators to disable the monitoring programs based on the log files.

As indicated above, FIGS. 2A-2B are provided as an example. Other examples may differ from what is described in connection with FIGS. 2A-2B. For example, the machine learning model may be trained using a different process than what is described in connection with FIG. 2A. Additionally, or alternatively, the machine learning model may employ a different machine learning algorithm than what is described in connection with FIGS. 2A-2B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
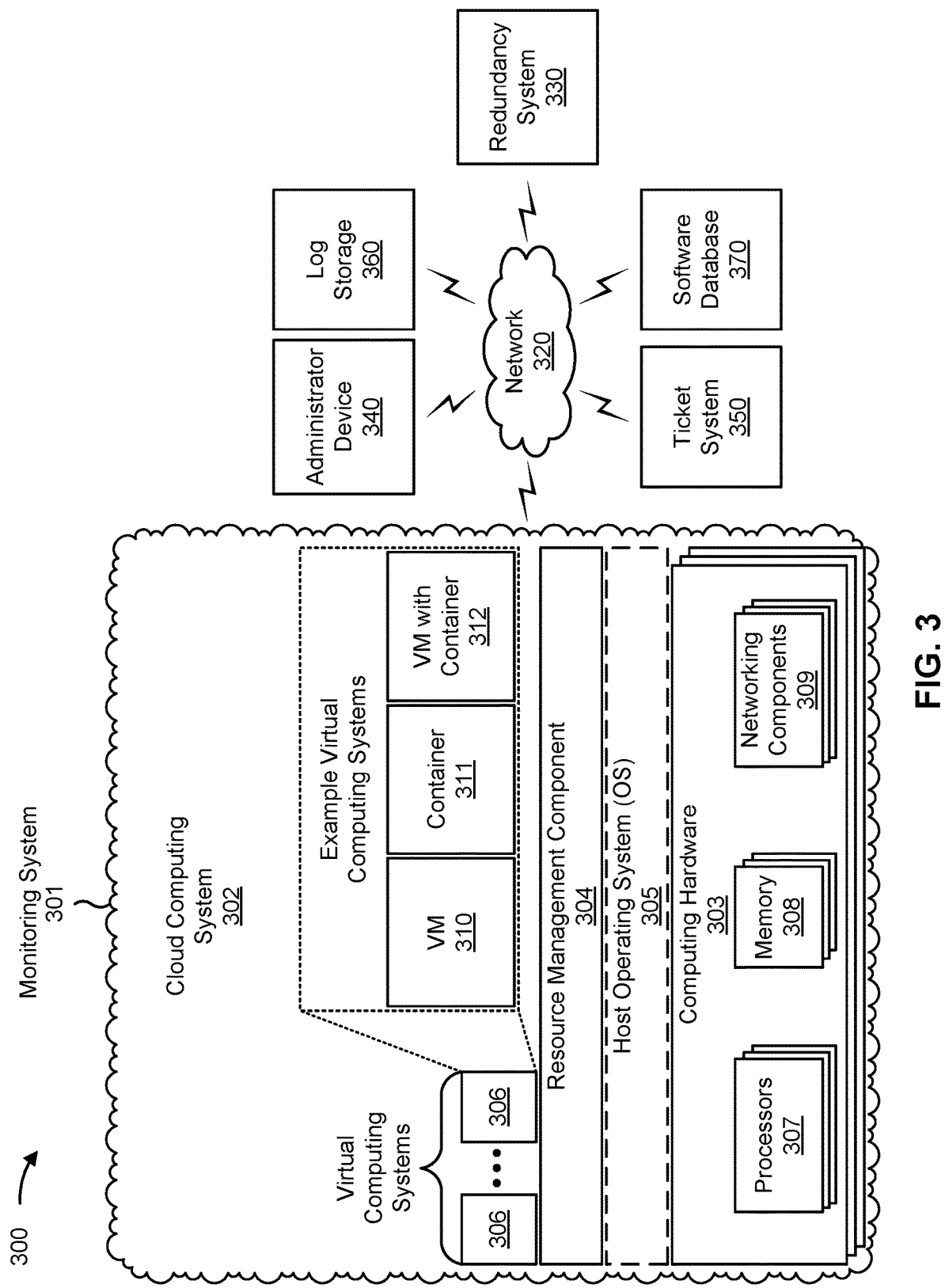
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a monitoring system 301, which may include one or more elements of and/or may execute within a cloud computing system 302. The cloud computing system 302 may include one or more elements 303-312, as described in more detail below. As further shown in FIG. 3, environment 300 may include a network 320, a redundancy system 330, an administrator device 340, a ticket system 350, a log storage 360, and/or a software database 370. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the monitoring system 301 may include one or more elements 303-312 of the cloud computing system 302, may execute within the cloud computing system 302, and/or may be hosted within the cloud computing system 302, in some implementations, the monitoring system 301 may not be cloud-based (e.g., may be implemented outside of a cloud computing system) or may be partially cloud-based. For example, the monitoring system 301 may include one or more devices that are not part of the cloud computing system 302, such as device 400 of FIG. 4, which may include a standalone server or another type of computing device. The monitoring system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The redundancy system 330 may include one or more devices capable of receiving, generating, storing, processing, providing, and/or routing information associated with log files, as described elsewhere herein. The redundancy system 330 may include a communication device and/or a computing device. For example, the redundancy system 330 may include a server, such as an application server, a client server, a web server, a database server, a host server, a proxy server, a virtual server (e.g., executing on computing hardware), or a server in a cloud computing system. In some implementations, the redundancy system 330 may include computing hardware used in a cloud computing environment. The redundancy system 330 may communicate with one or more other devices of environment 300, as described elsewhere herein.

The administrator device 340 may include one or more devices capable of receiving, generating, storing, processing, and/or providing information associated with log files, as described elsewhere herein. The administrator device 340 may include a communication device and/or a computing device. For example, the administrator device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 340 may communicate with one or more other devices of environment 300, as described elsewhere herein.

The ticket system 350 may include one or more devices capable of receiving, generating, storing, processing, and/or providing information associated with tickets, as described elsewhere herein. The ticket system 350 may include a communication device and/or a computing device. For example, the ticket system 350 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ticket system 350 may include an issue tracking system, such as Jira or Bugzilla®, among other examples. The ticket system 350 may communicate with one or more other devices of environment 300, as described elsewhere herein.

The log storage 360 may include one or more devices capable of receiving, generating, storing, processing, and/or providing information associated with log files, as described elsewhere herein. The log storage 360 may include a communication device and/or a computing device. For example, the log storage 360 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The log storage 360 may communicate with one or more other devices of environment 300, as described elsewhere herein.

The software database 370 may be implemented on one or more devices capable of receiving, generating, storing, processing, and/or providing information associated with metrics, as described elsewhere herein. The software database 370 may be implemented on a communication device and/or a computing device. For example, the software database 370 may be implemented on a server, a database server, an application server, a client server, a web server, a host server, a proxy server, a virtual server (e.g., executing on computing hardware), a server in a cloud computing system, a device that includes computing hardware used in a cloud computing environment, or a similar type of device. The software database 370 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
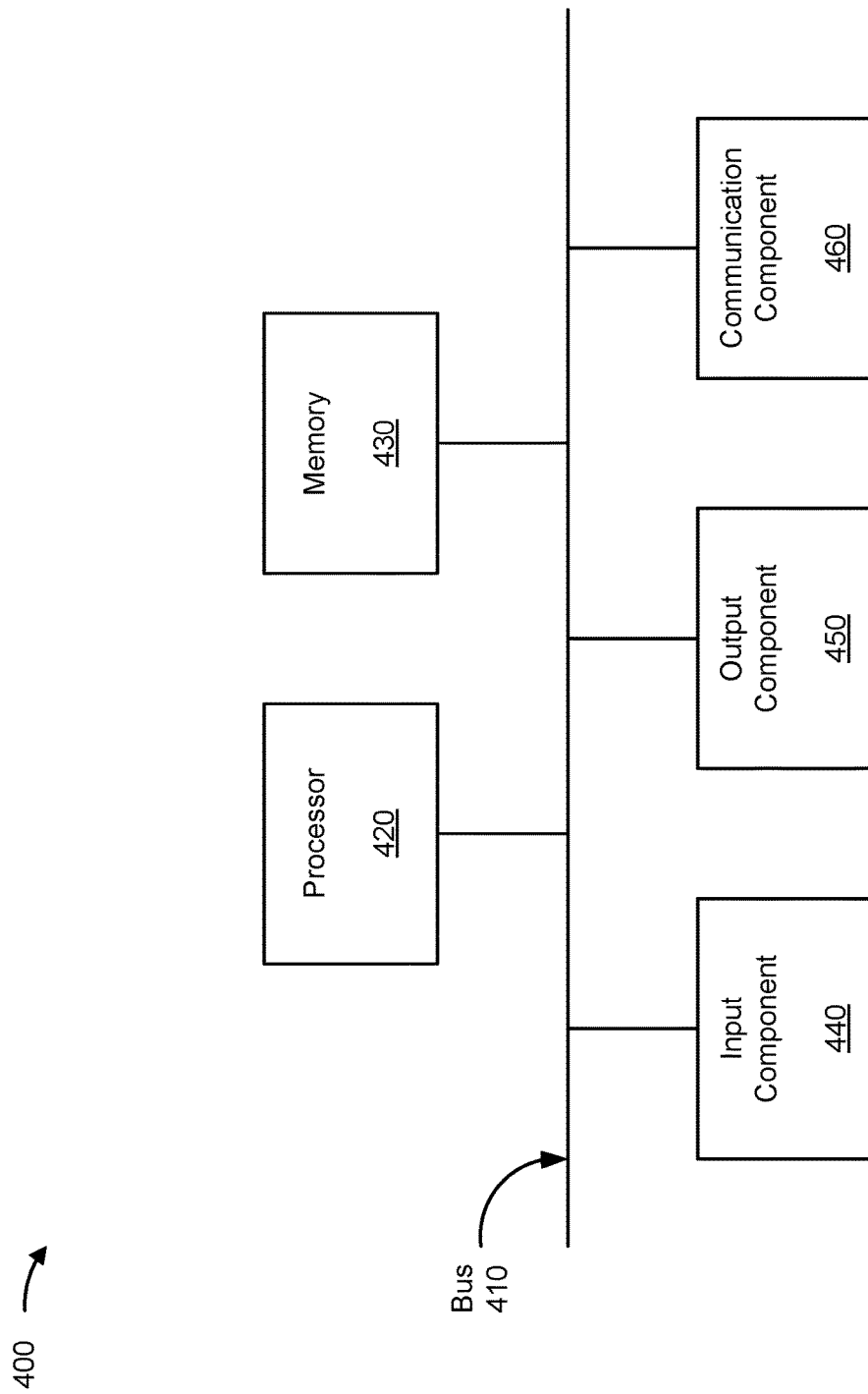
FIG. 4 is a diagram of example components of one or more devices of FIG. 3, in accordance with some embodiments of the present disclosure.

FIG. 4 is a diagram of example components of a device 400 associated with detecting and reducing monitoring redundancies. The device 400 may correspond to a redundancy system 330, an administrator device 340, a ticket system 350, a log storage 360, and/or a device implementing a software database 370. In some implementations, a redundancy system 330, an administrator device 340, a ticket system 350, a log storage 360, and/or a device implementing a software database 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
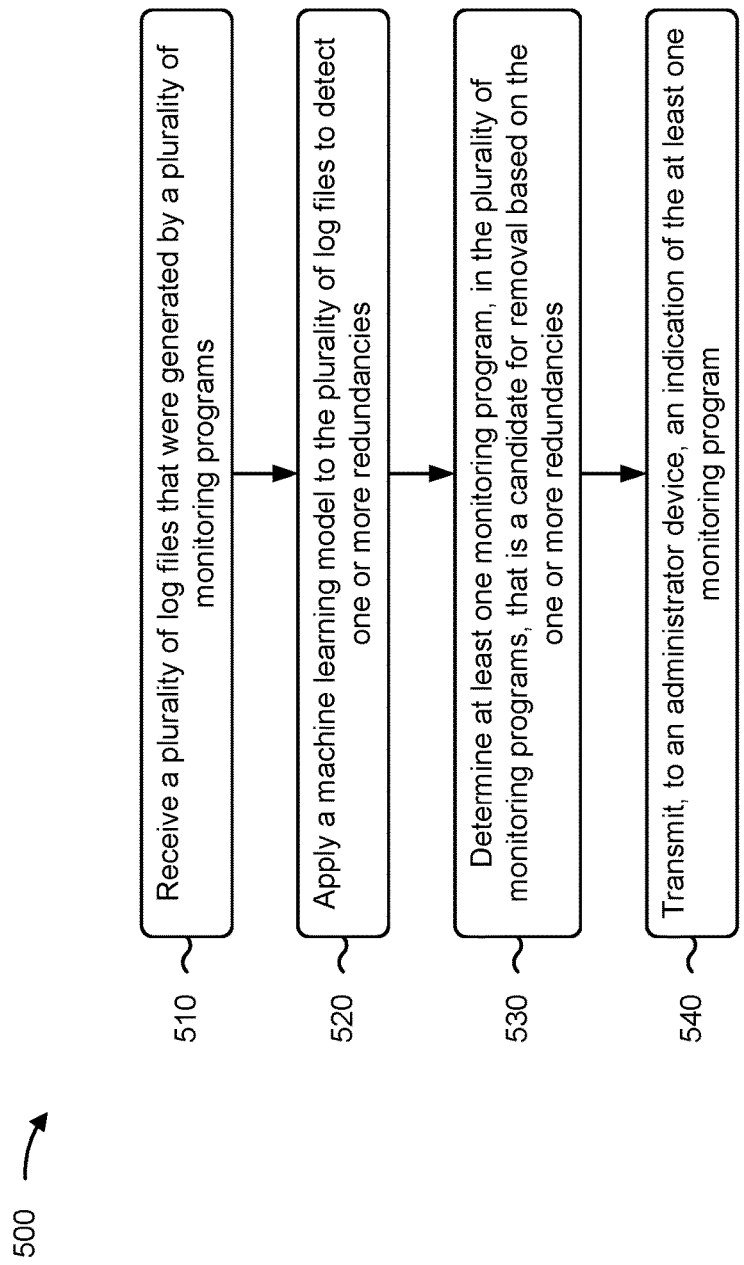
FIG. 5 is a flowchart of an example process relating to detecting and reducing monitoring redundancies, in accordance with some embodiments of the present disclosure.

FIG. 5 is a flowchart of an example process 500 associated with detecting and reducing monitoring redundancies. In some implementations, one or more process blocks of FIG. 5 may be performed by the redundancy system 330. In some implementations, one or more process blocks of FIG. 5 may be performed by another device or a group of devices separate from or including the redundancy system 330, such as a monitoring system 301, an administrator device 340, a ticket system 350, a log storage 360, and/or a device implementing a software database 370. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a plurality of log files that were generated by a plurality of monitoring programs (block 510). For example, the redundancy system 330 (e.g., using processor 420, memory 430, input component 440, and/or communication component 460) may receive a plurality of log files that were generated by a plurality of monitoring programs, as described above in connection with reference number 115 of FIG. 1A. As an example, the redundancy system 330 may transmit, and a log storage may receive, a request for the plurality of log files. Accordingly, the log storage may transmit, and the redundancy system 330 may receive, the plurality of log files in response to the request from the redundancy system 330.

As further shown in FIG. 5, process 500 may include applying a machine learning model to the plurality of log files to detect one or more redundancies (block 520). For example, the redundancy system 330 (e.g., using processor 420 and/or memory 430) may apply a machine learning model to the plurality of log files to detect one or more redundancies, as described above in connection with reference number 125 of FIG. 1B. As an example, the machine learning model may determine which files, out of the plurality of log files, are redundant as compared with remaining files out of the plurality of log files.

As further shown in FIG. 5, process 500 may include determining at least one monitoring program, in the plurality of monitoring programs, that is a candidate for removal based on the one or more redundancies (block 530). For example, the redundancy system 330 (e.g., using processor 420 and/or memory 430) may determine at least one monitoring program, in the plurality of monitoring programs, that is a candidate for removal based on the one or more redundancies, as described above in connection with reference number 125 of FIG. 1B. As an example, the redundancy system 330 may map some log files, determined as redundant by the machine learning model, to the at least one monitoring program, using a data structure that maps identifiers of log files to identifiers of monitoring programs, and thus may identify the at least one monitoring program as a candidate for removal. Additionally, or alternatively, the redundancy system 330 may map metrics, included in log files that are determined as redundant by the machine learning model, to the at least one monitoring program, using a data structure that maps identifiers of metrics to identifiers of monitoring programs, and thus may identify the at least one monitoring program as a candidate for removal.

As further shown in FIG. 5, process 500 may include transmitting, to an administrator device, an indication of the at least one monitoring program (block 540). For example, the redundancy system 330 (e.g., using processor 420, memory 430, and/or communication component 460) may transmit, to an administrator device, an indication of the at least one monitoring program, as described above in connection with reference number 130c of FIG. 1C. As an example, the indication may be a visual indication (e.g., based on instructions for a UI from the redundancy system 330). Additionally, or alternatively, the indication may be included in an email message or a text message. The administrator device may transmit, and the redundancy system may receive, a confirmation of the at least one monitoring program (that is a candidate for removal), such that the redundancy system 330 may transmit a command to disable the at least one monitoring program (that is a candidate for removal) in response to the confirmation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D and/or FIGS. 2A-2B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for detecting and reducing monitoring redundancies, the system comprising:
   one or more memories; and
   one or more processors, communicatively coupled to the one or more memories, configured to:
      receive a plurality of log files that were generated by a plurality of monitoring programs;
      apply a machine learning model to the plurality of log files to detect one or more redundancies;
      determine at least one monitoring program, in the plurality of monitoring programs, that is a candidate for removal based on the one or more redundancies,
         wherein the one or more processors, when determining the at least one monitoring program, are to:
            map a set of log files, from the plurality of log files, that are determined based on the one or more redundancies, to the at least one monitoring program using a data structure that maps identifiers of the set of log files to identifiers of the at least one monitoring program to identify the at least one monitoring program as the candidate for removal;
      detect at least one log file, in the plurality of log files, that satisfies a removal condition;
      transmit a command to disable the at least one monitoring program; and
      transmit a command to discard the at least one log file.

2. The system of claim 1, wherein the one or more processors are configured to:
   receive, from an administrator device, a confirmation of the at least one monitoring program,
      wherein the command to disable the at least one monitoring program is transmitted in response to the confirmation.

3. The system of claim 1, wherein the one or more processors are configured to:
   receive, from an administrator device, a confirmation of the at least one log file,
      wherein the command to discard the at least one log file is transmitted in response to the confirmation.

4. The system of claim 1, wherein the removal condition includes at least one of:
   a most recent access time associated with the at least one log file satisfying an access threshold; or
   a creation time or a modification time associated with the at least one log file satisfying an age threshold.

5. The system of claim 1, wherein the one or more processors, to determine the at least one monitoring program that is a candidate for removal, are configured to:
   receive an indication of one or more metrics captured by the at least one monitoring program; and
   determine the at least one monitoring program based on the one or more redundancies corresponding to the one or more metrics.

6. The system of claim 1, wherein the one or more processors, to transmit the command to disable the at least one monitoring program, are configured to:
   transmit the command, to disable the at least one monitoring program, to a cloud environment implementing the at least one monitoring program.

7. The system of claim 1, wherein the one or more processors, to transmit the command to discard the at least one log file, are configured to:
   transmit the command, to discard the at least one log file, to a cloud storage associated with the at least one log file.

8. A method of detecting and reducing monitoring redundancies, comprising:
   receiving, from a log storage, a plurality of log files that were generated by a plurality of monitoring programs;
   applying, by a redundancy system, a machine learning model to the plurality of log files to detect one or more redundancies;
   determining, by the redundancy system, at least one monitoring program, in the plurality of monitoring programs, that is a candidate for removal based on the one or more redundancies,
      wherein determining the at least one monitoring program comprises:
         mapping a set of log files, from the plurality of log files, that are determined based on the one or more redundancies, to the at least one monitoring program using a data structure that maps identifiers of the set of log files to identifiers of the at least one monitoring program to identify the at least one monitoring program as the candidate for removal; and
   transmitting, to a ticket system, a command to open a ticket associated with the at least one monitoring program,
      wherein the command to open the ticket includes a command to disable the at least one monitoring program.

9. The method of claim 8, further comprising:
   identifying at least one user associated with the at least one monitoring program,
      wherein the command to open the ticket indicates the at least one user.

10. The method of claim 8, wherein receiving the plurality of log files comprises:
    receiving, from an administrator device, an indication of a location associated with the plurality of log files; and
    transmitting, to the log storage, a request for the plurality of log files that indicates the location,
       wherein the plurality of log files are received in response to the request.

11. The method of claim 8, further comprising:
determining, by the redundancy system, at least one additional monitoring program that is a candidate for addition based on the one or more redundancies, wherein the command to open the ticket indicates the at least one additional monitoring program.

12. The method of claim 8, wherein the plurality of log files are associated with a cloud-based application.

13. The method of claim 8, wherein the plurality of log files are associated with an application programming interface endpoint.

14. A non-transitory computer-readable medium storing a set of instructions for detecting and reducing monitoring redundancies, the set of instructions comprising:
one or more instructions that, when executed by one or more processors of a device, cause the device to:
receive a plurality of log files that were generated by a plurality of monitoring programs;
apply a machine learning model to the plurality of log files to detect one or more redundancies;
determine at least one monitoring program, in the plurality of monitoring programs, that is a candidate for removal based on the one or more redundancies, wherein the one or more instructions, when executed by the one or more processors to determine the at least one monitoring program, cause the device to:
map a set of log files, from the plurality of log files, that are determined based on the one or more redundancies, to the at least one monitoring program using a data structure that maps identifiers of the set of log files to identifiers of the at least one monitoring program to identify the at least one monitoring program as the candidate for removal; and
transmit, to an administrator device, an indication of the at least one monitoring program,
wherein the indication includes an indication to disable the at least one monitoring program.

15. The non-transitory computer-readable medium of claim 14, wherein the one or more instructions, when executed by the one or more processors, cause the device to:
detect at least one log file, in the plurality of log files, that satisfies a removal condition; and
transmit, to the administrator device, an indication of the at least one log file.

16. The non-transitory computer-readable medium of claim 15, wherein the one or more instructions, when executed by the one or more processors, cause the device to:
receive, from the administrator device, a confirmation of the at least one log file; and
transmit a command to discard the at least one log file in response to the confirmation.

17. The non-transitory computer-readable medium of claim 14, wherein the indication is a visual indication.

18. The non-transitory computer-readable medium of claim 14, wherein the indication is included in an email message or a text message.

19. The non-transitory computer-readable medium of claim 14, wherein the one or more instructions, when executed by the one or more processors, cause the device to:
receive, from the administrator device, a confirmation of the at least one monitoring program; and
transmit a command to disable the at least one monitoring program in response to the confirmation.

20. The non-transitory computer-readable medium of claim 14, wherein the one or more instructions, when executed by the one or more processors, cause the device to:
determine at least one additional monitoring program that is a candidate for addition based on the one or more redundancies; and
transmit, to the administrator device, an indication of the at least one additional monitoring program.

* * * * *